US012800814B2

(12) United States Patent
Hong et al.

(10) Patent No.: US 12,800,814 B2
(45) Date of Patent: Nov. 17, 2026

(54) POLARIZING PLATE AND OPTICAL DISPLAY APPARATUS COMPRISING THE SAME

(71) Applicant: SAMSUNG SDI CO., LTD., Yongin-si (KR)

(72) Inventors: Hyun Ah Hong, Suwon-si (KR); Dae Gyu Lee, Suwon-si (KR); Jin Ah Seo, Suwon-si (KR); Jang Hyun Cho, Suwon-si (KR); Eun Hwa Lee, Suwon-si (KR)

(73) Assignee: HOARDSUN HENGXIN(WUXI) MATERIALS CO., LTD., Wuxi (CN)

( * ) Notice: Subject to any disclaimer, the term of this patent is extended or adjusted under 35 U.S.C. 154(b) by 957 days.

(21) Appl. No.: 18/045,762

(22) Filed: Oct. 11, 2022

(65) Prior Publication Data

US 2023/0118043 A1 Apr. 20, 2023

(30) Foreign Application Priority Data

Oct. 19, 2021 (KR) ........................ 10-2021-0139326
Aug. 31, 2022 (KR) ........................ 10-2022-0109546

(51) Int. Cl.
*G02B 5/30* (2006.01)
*G02B 1/11* (2015.01)
(Continued)

(52) U.S. Cl.
CPC ................ *G02B 5/305* (2013.01); *G02B 1/11* (2013.01); *G02B 1/14* (2015.01); *G02B 5/3033* (2013.01);
(Continued)

(58) Field of Classification Search
CPC . G02B 1/04; G02B 1/11; G02B 5/305; G02B 5/3033; G02B 5/223;
(Continued)

(56) References Cited

U.S. PATENT DOCUMENTS

2006/0014085 A1* 1/2006 Nakajima ............ G02B 5/0242 430/7
2011/0126975 A1 6/2011 Fujisawa et al.
2020/0209680 A1* 7/2020 Jung .................... G02B 5/3041

FOREIGN PATENT DOCUMENTS

JP H 09-297204 A 11/1997
JP 2001-249205 A 9/2001
(Continued)

OTHER PUBLICATIONS

Taiwanese Office Action dated Jan. 29, 2024 issued in corresponding Taiwanese Patent Application No. 111138923 (9 pages).
(Continued)

*Primary Examiner* — Sophie Hon
(74) *Attorney, Agent, or Firm* — Ricky Lam

(57) ABSTRACT

A polarizing plate and an optical display apparatus including the same are provided. A polarizing plate includes: a polarizer; and an optically functional layer and a first protective layer stacked on a light exit surface of the polarizer, and the optically functional layer includes: a resin layer; and acicular microparticles, the resin layer being formed of a composition including an active energy ray curable resin, the acicular microparticles being oriented in an in-plane direction of the optically functional layer, and, where a light absorption axis of the polarizer is 0°, angles between longitudinal directions of the acicular microparticles and the light absorption axis of the polarizer have an average of −10° to +10° and a standard deviation of 15° or less.

18 Claims, 3 Drawing Sheets

(51) Int. Cl.
*G02B 1/14* (2015.01)
*G02F 1/1335* (2006.01)
*G02F 1/13363* (2006.01)

(52) U.S. Cl.
CPC .. *G02F 1/133528* (2013.01); *G02F 1/133531* (2021.01); *C09K 2323/03* (2020.08); *G02F 1/13363* (2013.01)

(58) Field of Classification Search
CPC ......... G02F 1/133528; G02F 1/133504; C09K 2323/03; C09K 2323/031; H10K 59/8792
See application file for complete search history.

(56) References Cited

FOREIGN PATENT DOCUMENTS

| | | | | | |
|---|---|---|---|---|---|
| JP | 2009-092796 | A | | 4/2009 | |
| KR | 10-0756576 | B1 | | 9/2007 | |
| KR | 10-2016-0007548 | A | | 1/2016 | |
| KR | 10-2018-0047569 | A | | 5/2018 | |
| KR | 102950026 | B1 | * | 4/2026 | ........... G02F 1/1337 |
| TW | 200500739 | A | | 1/2005 | |
| TW | I871535 | B | * | 2/2025 | ............... G02B 1/14 |

OTHER PUBLICATIONS

Korean Office Action dated Jun. 23, 2025, issued in corresponding Korean Patent Application No. 10-2022-0109546 (8 pages).

* cited by examiner

POLARIZING PLATE AND OPTICAL DISPLAY APPARATUS COMPRISING THE SAME

CROSS-REFERENCE TO RELATED APPLICATION

This application claims priority to and the benefit of Korean Patent Application No. 10-2021-0139326, filed on Oct. 19, 2021, and Korean Patent Application No. 10-2022-0109546, filed on Aug. 31, 2022, in the Korean Intellectual Property Office, the entire disclosure of each of which is incorporated herein by reference.

BACKGROUND

1. Field

Aspects of embodiments of the present invention relate to a polarizing plate and an optical display apparatus including the same.

2. Description of the Related Art

A liquid crystal display is operated by allowing light emitted from a backlight unit to pass through a light source-side polarizing plate, a liquid crystal panel, and a viewer-side polarizing plate in the stated order. Light emitted from a light source is diffused through the backlight unit before entering the light source-side polarizing plate. As a result, there is a problem of gradual deterioration in contrast ratio and visibility from a front side to lateral sides while the diffused light passes through the light source-side polarizing plate, the liquid crystal panel, and the viewer-side polarizing plate.

In order to improve contrast ratio or visibility at the front side and the lateral sides, addition of a contrast ratio or visibility enhancing layer to the viewer-side polarizing plate has been considered. The contrast ratio or visibility enhancing layer has an embossed or engraved optical pattern at an interface between a low refractivity layer and a high refractivity layer such that light can be refracted by the optical pattern, thereby improving the contrast ratio and visibility.

However, the contrast ratio or visibility enhancing layer having such an optical pattern requires a pattern formation process. In addition, the contrast ratio or visibility enhancing layer requires two layers, that is, the low refractivity layer and the high refractivity layer. The pattern formation process is realized by a hard molding process and a soft molding process, in which a pattern is engraved at a certain pitch on a pattern roll to be transferred from the pattern roll to a film. However, when a defect is formed on the pattern roll in the pattern formation process, the defect can also be transferred to a film to which the pattern is to be transferred, thereby causing deterioration in processability. As a result, the contrast ratio or visibility enhancing layer can make it difficult to fabricate the polarizing plate and can require additional costs while increasing the thickness of the polarizing plate.

In recent years, with increasing interest in flexible optical displays, there is a need for development of a polarizing plate having flexibility.

The background technique of the present invention is disclosed in Korean Patent Laid-open Publication No. 10-2018-0047569.

SUMMARY

According to an aspect of embodiments of the present invention, a polarizing plate that improves contrast ratio and/or brightness without an optical pattern or a pattern layer including the optical pattern is provided.

According to another aspect of embodiments of the present invention, a polarizing plate that improves manufacturing processability and achieves thickness reduction through elimination of an optical pattern or a pattern layer is provided.

According to another aspect of embodiments of the present invention, a polarizing plate that includes an optically functional layer having good hardness and flexibility is provided.

Aspects of one or more embodiments of the present invention relate to a polarizing plate.

According to one or more embodiments, a polarizing plate includes: a polarizer; and an optically functional layer and a first protective layer stacked on a light exit surface of the polarizer, wherein the optically functional layer includes: a resin layer; and acicular microparticles, the resin layer being formed of a composition including an active energy ray curable resin, the acicular microparticles being oriented in an in-plane direction of the optically functional layer, and, where a light absorption axis of the polarizer is 0°, angles between longitudinal directions of the acicular microparticles and the light absorption axis of the polarizer have an average of −10° to +10° and a standard deviation of 15° or less.

In one or more embodiments, the optically functional layer and the first protective layer may be sequentially stacked on the polarizer in the stated order, or the first protective layer and the optically functional layer may be sequentially stacked on the polarizer in the stated order.

In one or more embodiments, the optically functional layer may include a contrast ratio-enhancing layer.

In one or more embodiments, the optically functional layer may be flat on overall upper and lower surfaces thereof.

In one or more embodiments, the optically functional layer may have an indentation modulus of $2.0\times10^3$ MPa to $3.5\times10^3$ MPa.

In one or more embodiments, the acicular microparticles may be impregnated into the resin layer.

In one or more embodiments, the acicular microparticles may have a higher index of refraction than the resin layer.

In one or more embodiments, a difference in index of refraction between the acicular microparticles and the resin layer may be 0.8 or less.

In one or more embodiments, the composition may be an active energy ray curable composition.

In one or more embodiments, the composition may further include at least one selected from among a photoinitiator and a polyfunctional monomer.

In one or more embodiments, the acicular microparticles may be present in an amount of 1% by weight (wt %) to 30 wt % in the optically functional layer.

In one or more embodiments, the acicular microparticles may have a higher index of refraction than the resin layer.

In one or more embodiments, the acicular microparticles may be formed of at least one selected from among titanium oxide, zirconium oxide, zinc oxide, calcium carbonate, boehmite, aluminum borate, calcium silicate, magnesium sulfate, magnesium sulfate hydrate, potassium titanate, glass, and a synthetic resin.

In one or more embodiments, a surface of the acicular microparticles may be modified.

In one or more embodiments, the acicular microparticles may have a length L of 10 μm to 30 μm, a diameter D of 0.5 μm to 2 μm, and an average of an aspect ratio of 5 to 60.

In one or more embodiments, the first protective layer may have an in-plane retardation of 4,000 nm or more at a wavelength of 550 nm.

In one or more embodiments, the first protective layer may further include a functional coating layer on an upper surface thereof or on a lower surface thereof.

In one or more embodiments, the functional coating layer may include at least one selected from among a hard coating layer, a scattering layer, a low reflectivity layer, an ultra-low reflectivity layer, a primer layer, an anti-fingerprint layer, an antireflection layer, and an antiglare layer.

Aspects of one or more embodiments of the present invention relate to an optical display apparatus.

According to one or more embodiments, an optical display apparatus includes the polarizing plate according to an embodiment of the present invention.

According to an aspect, embodiments of the present invention provide a polarizing plate that improves contrast ratio and/or brightness without an optical pattern or a pattern layer including the optical pattern.

According to another aspect, embodiments of the present invention provide a polarizing plate that improves manufacturing processability and achieves thickness reduction through elimination of an optical pattern or a pattern layer.

According to another aspect, embodiments of the present invention provide a polarizing plate that includes an optically functional layer having good hardness and flexibility.

DETAILED DESCRIPTION

Figure 1:
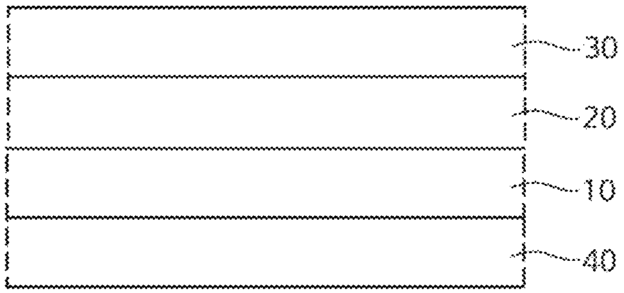
FIG. 1 is a cross-sectional view of a polarizing plate according to an embodiment of the present invention.

Herein, some embodiments of the present invention will be described in further detail with reference to the accompanying drawings, such that the present invention can be easily implemented by those skilled in the art. It is to be understood that the present invention may be embodied in different ways and is not limited to the following embodiments.

In the drawings, components unrelated to the description may be omitted for clarity of description of the invention, and like components will be denoted by like reference numerals throughout the specification.

Herein, spatially relative terms, such as "upper" and "lower," are defined with reference to the accompanying drawings. Thus, it is to be understood that "upper surface" can be used interchangeably with "lower surface." Further, when an element, such as a layer or a film, is referred to as being placed "on" another element, it may be directly placed on the other element, or one or more intervening elements may be present. On the other hand, when an element is referred to as being placed "directly on" another element, there are no intervening element(s) therebetween.

Herein, "in-plane retardation (Re)" is a value measured at a wavelength of 550 nm, as calculated according to the following Equation A:

$$Re=(nx-ny)\times d, \qquad \text{Equation A}$$

where nx and ny are the indexes of refraction of a protective layer in a slow axis direction and a fast axis direction of the protective layer at a wavelength of 550 nm, respectively, and d is the thickness (unit: nm) of the protective layer.

Herein, "(meth)acryl" refers to acryl and/or methacryl.

Herein, "index of refraction" may be a value measured at a wavelength of 380 nm to 780 nm, specifically at 550 nm.

Herein, "modulus" of an optically functional layer refers to an indentation modulus. Specifically, the indentation modulus is a value measured on the optically functional layer upon pressing a surface of the optically functional layer with a force F=20 mN/10 sec using a micro-indenter at 25 °C. Modulus can be measured by a method used in examples described below.

As used herein to represent a specific numerical range, "X to Y" means "X≤ and ≤Y."

One or more embodiments of the present invention provide a polarizing plate which can improve contrast ratio and/or brightness at front and lateral sides without an optical pattern or a patterned layer including the optical pattern. The polarizing plate according to one or more embodiments of the present invention improves manufacturing processability and achieves thickness reduction through elimination of an optical pattern or a pattern layer. One or more embodiments of the present invention provide a polarizing plate that includes an optically functional layer having good hardness and flexibility so as to be applicable to a foldable or flexible optical display apparatus.

The polarizing plate according to one or more embodiments of the present invention includes: a polarizer; and an optically functional layer and a first protective layer stacked on a light exit surface of the polarizer, wherein the optically functional layer includes: a resin layer; and acicular microparticles, the resin layer being formed of a composition including an active energy ray curable resin, the acicular microparticles being oriented in an in-plane direction of the optically functional layer, and, where a light absorption axis of the polarizer is 0°, angles between longitudinal directions of the acicular microparticles and the light absorption axis of the polarizer have an average of −10° to +10° and a standard deviation of 15° or less.

Herein, a polarizing plate according to an embodiment of the present invention will be described with reference to FIG. 1, FIG. 6, and FIG. 7.

Figure 6:
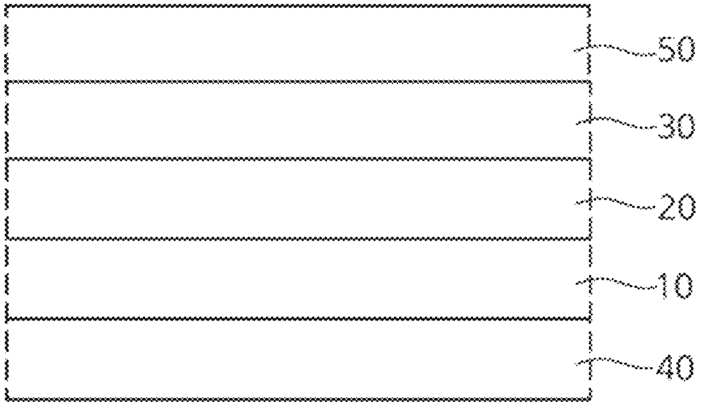
FIG. 6 is a cross-sectional view of a polarizing plate according to an embodiment of the present invention.
Figure 7:
FIG. 7 is a cross-sectional view of a polarizing plate according to an embodiment of the present invention.

Referring to FIG. 1, FIG. 6, and FIG. 7, the polarizing plate may include a polarizer 10, an optically functional layer 20, a first protective layer 30, and a second protective layer 40.

One surface of the polarizer 10, particularly an upper surface of the polarizer 10, may be a light exit surface of the polarizer 10 with reference to internal light of an optical display apparatus to which the polarizing plate is applied.

Accordingly, the optically functional layer 20 and the first protective layer 30 may be stacked on the light exit surface of the polarizer 10 with reference to internal light of the optical display apparatus. However, embodiments of the present invention are not limited thereto, and the optically functional layer 20 may be stacked on a light incidence surface of the polarizer 10 with reference to internal light of the optical display apparatus.

In an embodiment, the optically functional layer 20 and the first protective layer 30 are stacked on the light exit surface of the polarizer 10 with reference to internal light of the optical display apparatus. In this way, the effects of the present invention can be easily achieved. Here, "internal light" refers to light emitted from a light source of a backlight unit and propagated through the polarizer 10.

In an embodiment, the optically functional layer 20 and the first protective layer 30 may be sequentially stacked on the light exit surface of the polarizer 10 in the stated order from the polarizer 10.

In another embodiment, the first protective layer 30 and the optically functional layer 20 may be sequentially stacked on the light exit surface of the polarizer 10 in the stated order from the polarizer 10.

Optically Functional Layer 20

In the polarizing plate, the optically functional layer 20 may act as a contrast ratio and/or brightness-enhancing layer. In an embodiment, the optically functional layer 20 may act as a contrast ratio-enhancing layer.

Referring to FIG. 1, the optically functional layer 20 may be interposed between the polarizer 10 and the first protective layer 30. However, the location of the optically functional layer 20 may be changed and will be described in further detail below.

An upper surface of the optically functional layer 20, that is, a light exit surface, and a lower surface of the optically functional layer 20, that is, a light incidence surface thereof, are generally flat and are not patterned, as shown in FIG. 1. Nevertheless, the optically functional layer 20 can improve front and lateral contrast ratio and/or brightness by containing acicular microparticles described below, wherein the acicular microparticles are oriented in an in-plane direction of the optically functional layer, and angles between longitudinal directions of one or more acicular microparticles and a light absorption axis of the polarizer have an average of −10° to +10° and a standard deviation of 15° or less. Accordingly, the polarizing plate according to embodiments of the present invention can improve manufacturing processability while achieving thickness reduction through elimination of an optical pattern or a patterned layer.

Figure 2:
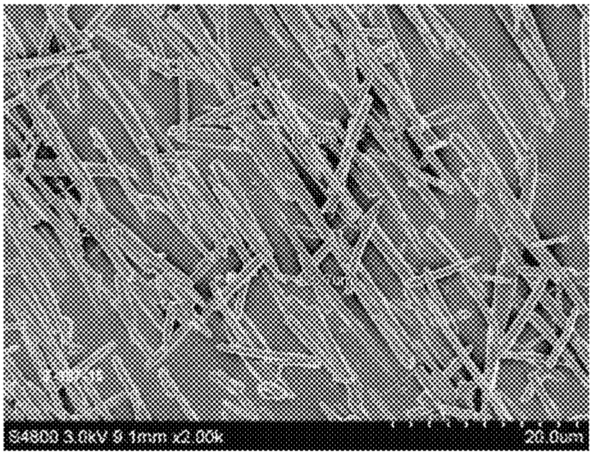
FIG. 2 is a TEM image of acicular microparticles according to an embodiment of the present invention.

FIG. 2 is a TEM image of acicular microparticles according to an embodiment of the present invention. Referring to FIG. 2, the acicular microparticles have a cross-section (e.g., a predetermined cross-section) and a length (e.g., a predetermined length). Next, the acicular microparticles will be described in further detail with reference to FIG. 3.

Figure 3:
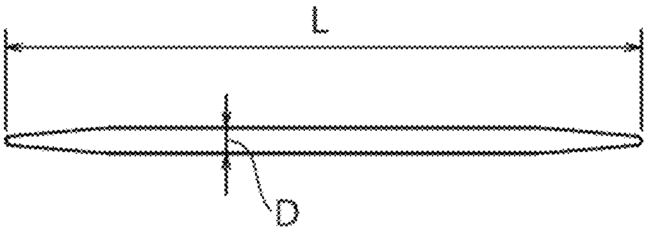
FIG. 3 is a longitudinal cross-sectional view of an acicular microparticle according to an embodiment of the present invention.

Referring to FIG. 3, the acicular microparticles have a length (e.g., a predetermined length) L and a diameter (e.g., a predetermined diameter) D, wherein the diameter D decreases toward both ends thereof rather than being uniform across the length L. The acicular microparticles having a non-uniform thickness have optical anisotropy, whereby incident light received from the polarizer can be emitted in different directions upon passing through the acicular microparticles.

FIG. 3 shows an acicular microparticle decreased in diameter toward both ends thereof. However, embodiments of the present invention are not limited thereto and the acicular microparticles according to the present invention may have a diameter that is uniform toward one end thereof while decreasing toward the other end thereof, depending on a method of preparing the acicular microparticles.

The acicular microparticles may refer to microparticles having a micrometer-sized length. The length L of the acicular microparticles is on the micrometer scale. Herein, the expression "having a micrometer-sized length" means that the length L of the acicular microparticles has a value of at least 1 μm. With this structure, the acicular microparticles are easy to orient in the desired direction specified herein and thus can assist in improving contrast ratio and brightness. By contrast, acicular nanoparticles, which have a nanometer-sized length L, are not easy to orient in a desired direction, thereby making it difficult to achieve the effects of the present invention.

In an embodiment, the acicular microparticles have a length L of 10 μm to 30 μm, and, in an embodiment, 10 μm, 11 μm, 12 μm, 13 μm, 14 μm, 15 μm, 16 μm, 17 μm, 18 μm, 19 μm, 20 μm, 21 μm, 22 μm, 23 μm, 24 μm, 25 μm, 26 μm, 27 μm, 28 μm, 29 μm, or 30 μm, and, in an embodiment, 15 μm to 28 μm. Within this range, the acicular microparticles can be easily oriented in a desired direction, thereby facilitating improvement in contrast ratio and brightness.

In an embodiment, the acicular microparticles may have a diameter D of 0.5 μm to 2 μm, and, in an embodiment, 0.5 μm, 0.6 μm, 0.7 μm, 0.8 μm, 0.9 μm, 1 μm, 1.1 μm, 1.2 μm, 1.3 μm, 1.4 μm, 1.5 μm, 1.6 μm, 1.7 μm, 1.8 μm, 1.9 μm, or 2 μm, and, in an embodiment, 1 μm to 2 μm. Within this range, the acicular microparticles can provide lateral diffusion through increase in aspect ratio thereof.

In an embodiment, the acicular microparticles may have an average of an aspect ratio of 5 to 60. Within this range, the acicular microparticles can be effective in improving the contrast ratio and brightness. In an embodiment, the acicular microparticles may have an average of an aspect ratio of 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60, and, in an embodiment, 10 to 50, and, in an embodiment, 10 to 18.

Here, "average of aspect ratio" refers to an average of aspect ratios of the acicular microparticles and "aspect ratio" refers to a length-to-maximum diameter ratio of each of the acicular microparticles.

The acicular microparticles are aligned at an orientation angle (e.g., a predetermined orientation angle) in an in-plane direction of the optically functional layer. Here, where the light absorption axis of the polarizer is 0°, orientation angles of longitudinal directions of the acicular microparticles with respect to the light absorption axis of the polarizer may have an average of −10° to +10° and a standard deviation of 15° or less.

The acicular microparticles are aligned at an orientation angle (e.g., a predetermined orientation angle) in the in-plane direction of the optically functional layer. Here, where the light absorption axis of the polarizer is 0°, the orientation angle refers to an angle of the longitudinal direction of the acicular microparticle with respect to the light absorption axis of the polarizer. A spherical particle, which does not have a longitudinal direction, does not have an orientation angle.

According to embodiments of the present invention, since the orientation angles of the acicular microparticles have an average of −10° to +10° and a standard deviation of 15° or less, light emitted from the polarizer can be propagated in different directions through the acicular microparticles, thereby improving front/lateral contrast ratio and brightness. The light absorption axis of the polarizer may be a machine direction (MD) of the polarizer.

Next, the average and standard deviation of the orientation angles will be described with reference to FIG. 4 and FIGS. 5A and 5B.

Figure 4:
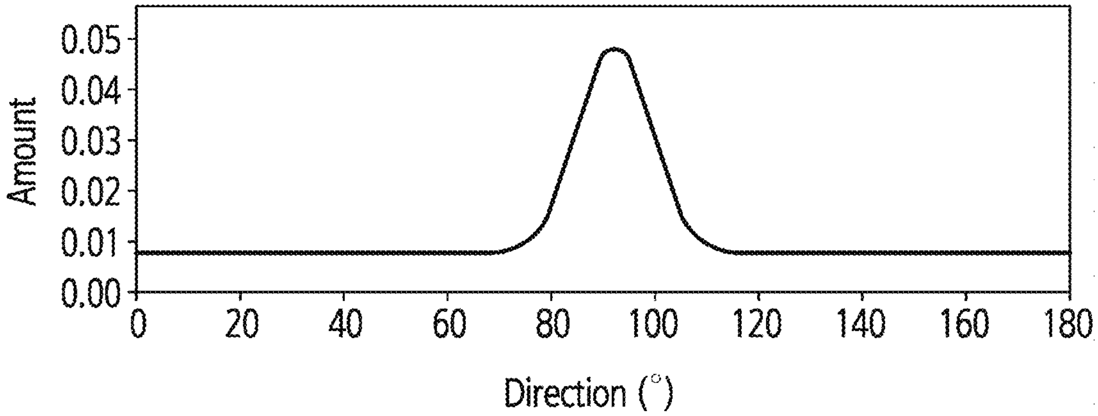
FIG. 4 is a schematic diagram showing a distribution of orientation angles of acicular microparticles in a resin layer according to an embodiment with respect to a light absorption axis of a polarizer, where the light absorption axis is 90°.
Figure 5A:
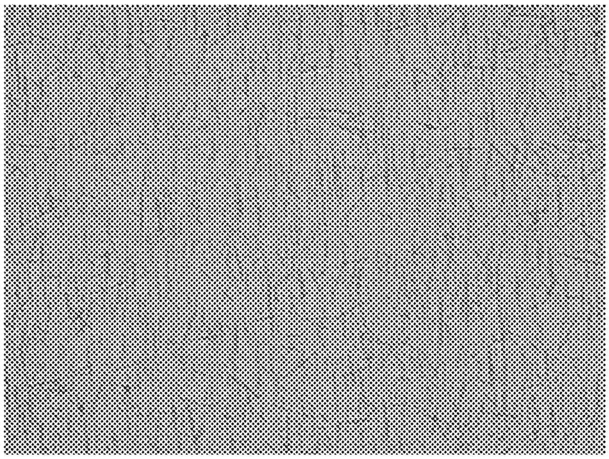
FIG. 5A is an image showing an orientation of acicular microparticles in a resin layer according to an embodiment of the present invention.
Figure 5B:
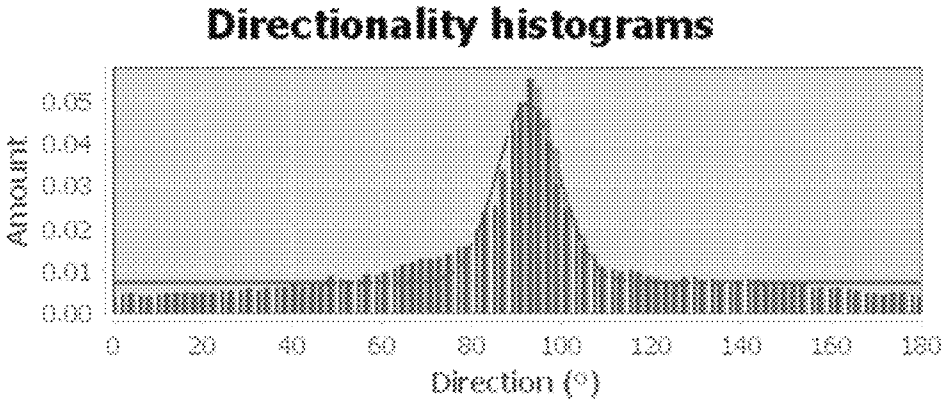
FIG. 5B is a diagram showing data measuring a distribution of orientation angles of the acicular microparticles with respect to a light absorption axis of the polarizer, where the light absorption axis is 90°.

FIG. 4 is a schematic diagram showing a distribution of angles of the longitudinal directions of the acicular microparticles with respect to a reference, where the light absorption axis of the polarizer is placed at 90° with respect to the reference. FIG. 5A is an image showing an orientation of acicular microparticles in an optically functional layer according to an embodiment of the present invention; and FIG. 5B is a diagram showing a distribution of actual orientation angles of acicular microparticles in an optically functional layer according to an embodiment of the present invention. According to the present invention, an average of the orientation angles of the acicular microparticles is obtained by calculating an average of the measurements of the angles, followed by subtracting 90° from the calculated average. For example, when the calculated average, from which 90° is subtracted, is 80°, the average of the orientation angles is −10° and, when the calculated average, from which 90° is subtracted, is 100°, the average of the orientation angles is +10°. A standard deviation of the orientation angles may be calculated from the distribution of the measurements of the angles by a typical method known in the art.

In an embodiment, the average of the orientation angles may be −10°, −9°, −8°, −7°, −6°, −5°, −4°, −3°, −2°, −1°, 0°, +1°, +2°, +3°, +4°, +5°, +6°, +7°, +8°, +9°, or +10°, and, in an embodiment, −4.0° to +4.0°, and, in an embodiment, −2.5° to +2.5°. In addition, in an embodiment, the standard deviation of the orientation angles may be 0°, 0.5°, 1°, 1.5°, 2°, 2.5°, 3°, 3.5°, 4°, 4.5°, 5°, 5.5°, 6°, 6.5°, 7°, 7.5°, 8°, 8.5°, 9°, 9.5°, 10°, 10.5°, 11°, 11.5°, 12°, 12.5°, 13°, 13.5°, 14°, 14.5°, or 15°, and, in an embodiment, 0° to 8.5°, and, in an embodiment, 5° to 8.5°. Within these ranges, the polarizing plate can achieve the effects of the present invention.

In an embodiment, at least 90%, for example, 95% to 100%, of the acicular microparticles may be aligned at an orientation angle of −10° and +10°. Within this range, the optically functional layer can provide uniform contrast ratio and improved visibility.

The acicular microparticles may have a higher index of refraction than a resin layer described below. In this way, the polarizing plate according to the present invention can further improve lateral contrast ratio and brightness.

A difference in index of refraction between the acicular microparticles and the resin layer may be 0.8 or less, and, in an embodiment, greater than 0, 0.05, 0.1, 0.15, 0.2, 0.25, 0.3, 0.35, 0.4, 0.45, 0.5, 0.55, 0.6, 0.65, 0.7, 0.75, or 0.8, and, in an embodiment, 0.5 or less, and, in an embodiment, 0.15 to 0.25. Within this range, the polarizing plate can further improve contrast ratio and brightness while improving optical properties of the resin layer.

In an embodiment, the acicular microparticles may have an index of refraction of 1.5 to 2.2, and, in an embodiment, 1.5, 1.55, 1.6, 1.65, 1.7, 1.75, 1.8, 1.85, 1.9, 1.95, 2, 2.05, 2.1, 2.15, or 2.2, and, in an embodiment, 1.6 to 1.8, and, in an embodiment, 1.65 to 1.7. Within this range, the acicular microparticles can have a suitable index of refraction relative to the resin layer described below, thereby facilitating improvement in contrast ratio and visibility.

The acicular microparticles may be formed of at least one selected from among metal oxides, such as titanium oxide (for example, $TiO_2$), zirconium oxide (for example, $ZrO_2$), and zinc oxide (for example, ZnO), metal compounds, such as calcium carbonate ($CaCO_3$), boehmite, aluminum borate (for example, $AlBO_3$), calcium silicate (for example, $CaSiO_3$, wollastonite), magnesium sulfate ($MgSO_4$), magnesium sulfate hydrate (for example, $MgSO_4{\cdot}7H_2O$), and potassium titanate (for example, $K_2Ti_8O_{17}$), inorganic particles, such as glass, and organic particles, such as synthetic resins, and the like. In an embodiment, the acicular microparticles may be formed of calcium carbonate ($CaCO_3$) to facilitate preparation thereof and achievement of the effects of the present invention.

In an embodiment, the acicular microparticles may be impregnated (included) into the resin layer without surface modification thereof. However, surface modification of the acicular microparticles can improve compatibility of the acicular microparticles with the resin layer formed of an organic material and dispersibility of the acicular microparticles in the resin layer to improve optical properties of the optically functional layer without aggregation of the acicular microparticles, thereby facilitating achievement of the effects of the present invention. In an embodiment, the acicular microparticles may be modified over 50% or more, for example, 50%, 55%, 60%, 65%, 70%, 75%, 80%, 85%, 90%, 95%, or 100%, and, in an embodiment, 60% to 100%, or 60% to 95%, of the entire surface area thereof. Within this range, the acicular microparticles can have improved compatibility and dispersibility.

In an embodiment, the surface of the acicular microparticles may be modified with at least one selected from among a silane-based compound, a surfactant, and oils. In an embodiment, the acicular microparticles are subjected to surface treatment with a silane-based compound having a (meth)acryloyloxy group or a (meth)acrylate group to have good compatibility with a matrix of a resin layer formed of an active energy ray curable composition described below and good dispersibility in the matrix.

The silane-based compound having the (meth)acryloyloxy group or the (meth)acrylate group may include at least one selected from among 3-(meth)acryloyloxypropylmethyldimethoxysilane, 3-(meth)acryloyloxypropyltrimethoxysilane, 3-(meth)acryloyloxypropylmethyldiethoxysilane, 3-(meth)acryloyloxypropyltriethoxysilane, and 3-(meth)acryloyloxypropyltrimethoxysilane, and, in an embodiment, at least one selected from among 3-(meth)acryloyloxypropyltrimethoxysilane and 3-(meth)acryloyloxypropyltriethoxysilane.

In an embodiment, a difference in index of refraction between the surface modified acicular microparticles and the resin layer may be 0.8 or less, and, in an embodiment, greater than 0, 0.05, 0.1, 0.15, 0.2, 0.25, 0.3, 0.35, 0.4, 0.45, 0.5, 0.55, 0.6, 0.65, 0.7, 0.75, or 0.8, and, in an embodiment, 0.5 or less, and, in an embodiment, 0.15 to 0.25. Within this range, the polarizing plate can further improve contrast ratio and brightness while improving optical properties of the resin layer.

In an embodiment, the surface modified acicular microparticles may have an index of refraction of 1.5 to 2.2, and, in an embodiment, 1.5, 1.55, 1.6, 1.65, 1.7, 1.75, 1.8, 1.85, 1.9, 1.95, 2, 2.05, 2.1, 2.15, or 2.2, and, in an embodiment, 1.6 to 1.8, and, in an embodiment, 1.65 to 1.7. Within this range, the acicular microparticles can have a suitable index of refraction relative to the resin layer described below, thereby facilitating improvement in contrast ratio and visibility.

In an embodiment, the acicular microparticles may be present in an amount of 1 wt % to 30 wt %, and, in an embodiment, 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, or 30 wt %, and, in an embodiment, 4 wt % to 15 wt %, in the optically functional layer. Within this range, the polarizing plate can achieve improvement in contrast ratio and brightness. However, an excess of the acicular microparticles can cause increase in haze of the optically functional layer.

The acicular microparticles may be disposed at an outermost portion of the upper surface of the optically functional layer or at an outermost portion of the lower surface thereof. In an embodiment, the acicular microparticles are uniformly dispersed in the optically functional layer, specifically in the resin layer.

The acicular microparticles may be impregnated into the resin layer.

The resin layer may be formed of a composition including an active energy ray curable resin. The resin layer refers to a layer free from the acicular microparticles in the optically functional layer. In this way, the resin layer can increase hardness of the optically functional layer and the polarizing plate while securing flexibility thereof. Since a resin layer formed of a composition including a heat curable resin has low hardness, the content of a curing agent is increased so as to increase hardness of the optically functional layer, causing deterioration in flexibility of the optically functional layer. As such, there is a problem in significant improvement in both flexibility and hardness of the optically functional layer, which are in a trade-off relationship.

The active energy ray curable resin is a resin capable of being cured by UV light and may include, for example, a resin having one or more photo-curable functional group. For example, the photo-curable functional group may include a vinyl group, an acrylate group, or a methacrylate group. The active energy ray curable resin may include at least one photocurable group selected from among these photocurable groups.

For example, the active energy ray curable resin may be selected from among resins capable of realizing the effects of the present invention, such as a (meth)acrylate based resin, a urethane (meth)acrylate based resin, an epoxy (meth)acrylate based resin, a silicone (meth)acrylate based resin, and the like.

The composition is an active energy ray curable composition and may further include at least one selected from among an initiator including a photo-initiator, which can cure the active energy ray curable resin, a crosslinking agent including a polyfunctional photocurable monomer and the like, and various additives. The initiator may be selected from among typical photo-initiators well-known to those skilled in the art and may include a photo-radical initiator, such as phosphorus based, phosphine oxide based, ketone based, and cyclohexyl ketone based photo-radical initiators. The polyfunctional photocurable monomer may be a monomer containing at least two, for example, 2 to 6, photocurable groups, and may be selected from typical kinds of polyfunctional photocurable monomers well-known to those skilled in the art. To facilitate dispersion of the acicular microparticles, the composition may include a dispersant as an additive. The dispersant may be selected from among typical dispersants, for example, DISPERBYK 180 (alkylol ammonium salt of copolymer with acidic groups), or the same series of dispersant, without being limited thereto.

In an embodiment, the optically functional layer may have an indentation modulus of $2.0\times10^3$ MPa to $3.5\times10^3$ MPa, and, in an embodiment, $2.0\times10^3$ MPa, $2.1\times10^3$ MPa, $2.2\times10^3$ MPa, $2.3\times10^3$ MPa, $2.4\times10^3$ MPa, $2.5\times10^3$ MPa, $2.6\times10^3$ MPa, $2.7\times10^3$ MPa, $2.8\times10^3$ MPa, $2.9\times10^3$ MPa, $3.0\times10^3$ MPa, $3.1\times10^3$ MPa, $3.2\times10^3$ MPa, $3.3\times10^3$ MPa, $3.4\times10^3$ MPa, or $3.5\times10^3$ MPa. Within this range, the resin layer can facilitate securing good flexibility and hardness of the optically functional layer. The indentation modulus of the optically functional layer can be realized through adjustment of the kind and/or the content of the active energy ray curable resin in the composition for the resin layer and the degree of cure of the composition or through adjustment of the amount or orientation angle of the acicular microparticles in the optically functional layer, an average and/or a standard deviation of orientation angles thereof, and the like.

In an embodiment, the resin layer may have an index of refraction of 1.4 to 1.6, and, in an embodiment, 1.4, 1.45, 1.5, 1.55, or 1.6, and, in an embodiment, 1.45 to 1.57, and, in an embodiment, 1.45 to 1.50. Within this range, the polarizing plate can further improve the contrast ratio and brightness.

In an embodiment, the resin layer may be a non-adhesive or non-bonding layer that does not exhibit adhesive properties and/or bonding properties.

In an embodiment, the optically functional layer 20 may have a thickness of 100 μm or less, and, in an embodiment, greater than 0 μm, 5 μm, 10 μm, 15 μm, 20 μm, 25 μm, 30 μm, 35 μm, 40 μm, 45 μm, 50 μm, 55 μm, 60 μm, 65 μm, 70 μm, 75 μm, 80 μm, 85 μm, 90 μm, 95 μm, or 100 μm, and, in an embodiment, greater than 0 μm to less than 50 μm, and, in an embodiment, 5 μm to 15 μm. Within this range, desired hardness of the polarizing plate can be secured.

In an embodiment, the optically functional layer 20 may have a light transmittance of 90% or more, and, in an embodiment, 90% to 100%. In an embodiment, the optically functional layer 20 may have a haze of 30% or less, and, in an embodiment, 0%, 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, or 30%, and, in an embodiment, 0% to 30%, and, in an embodiment, 10% to 25%. Within this range, the optically functional layer 20 can be used in the polarizing plate and can facilitate improvement in contrast ratio and brightness through reduction in white turbidity.

The optically functional layer 20 may be formed by a method described below.

In an embodiment, the optically functional layer 20 may be formed as a coating layer on the first protective layer 30 or on a release film. In an embodiment, the optically functional layer 20 may be formed by slot-die coating, micro-gravure coating, gap roll coating, or bar coating. The orientation angles of the acicular microparticles and the standard deviation thereof specified herein may be implemented by adjusting viscosity of a composition for the optically functional layer (100 cP to 400 cP at 25 °C) during formation of the composition or by adjusting the coating pressure (0.1 mPa to 0.4 mPa at 25 °C) during coating of the optically functional layer 20 onto the first protective layer 30, without being limited thereto. Here, the composition for the optically functional layer may be prepared by mixing the acicular microparticles with the composition for the resin layer.

The optically functional layer 20 formed on the release film by the above method may be provided to the first protective layer 30 by transferring the optically functional layer 20 from the release film thereto. Here, the optically functional layer 20 may be bonded to the first protective layer 30 via an adhesive layer or a bonding layer.

The optically functional layer 20 may be bonded to the polarizer 10 via an adhesive layer or a bonding layer.

First Protective Layer 30

The first protective layer 30 may be stacked on the light exit surface of the optically functional layer 20 with reference to internal light of an optical display apparatus, and may support the optically functional layer 20. The optically functional layer 20 may be directly stacked on the first protective layer 30 or may be stacked on the first protective layer 30 via an adhesive layer or a bonding layer.

In an embodiment, the first protective layer 30 may have an in-plane retardation of 4,000 nm or more at a wavelength of 550 nm. Within this range, the first protective layer 30 can facilitate improvement in contrast ratio and/or brightness in combination with the optically functional layer. In an embodiment, the first protective layer 30 has an in-plane retardation of 6,000 nm or more, or 8,000 nm or more, and, in an embodiment, 10,000 nm or more, and, in an embodiment, greater than 10,000 nm, and, in an embodiment, 10,100 nm to 30,000 nm, or 10,100 nm to 15,000 nm.

In another embodiment, the first protective layer 30 may have an in-plane retardation of less than 4,000 nm at a wavelength of 550 nm. For example, the first protective layer 30 may have an in-plane retardation of 0 nm to 1000 nm, and, in an embodiment, 10 nm to 500 nm, at a wavelength of 550 nm.

The first protective layer 30 may include a transparent base. The transparent base may have a different index of refraction than the optically functional layer 20. The transparent base may have a higher or lower index of refraction than the optically functional layer 20. In an embodiment, the transparent base has a higher index of refraction than the resin forming the optically functional layer 20. In this way, the transparent base can facilitate improvement in contrast ratio and brightness.

The transparent base may include an optically transparent resin film having a light incidence surface and a light exit surface facing the light incidence surface. The transparent base may be composed of a single layer of the resin film or multiple resin layers thereof. The resin may include at least one selected from among a cellulose ester based resin including triacetylcellulose (TAC) and the like, a cyclic polyolefin based resin including an amorphous cyclic olefin polymer (COP) and the like, a polycarbonate based resin, a polyester based resin including polyethylene terephthalate (PET) and the like, a polyether sulfone based resin, a polysulfone based resin, a polyamide based resin, a polyimide based resin, a non-cyclic polyolefin based resin, a polyacrylate based resin including poly(methyl methacrylate) and the like, a polyvinyl alcohol based resin, a polyvinyl chloride based resin, and a polyvinylidene chloride based resin, without being limited thereto. In an embodiment, the transparent base includes a polyester resin including polyethylene terephthalate (PET) and the like to further improve contrast ratio and brightness.

In an embodiment, the transparent base may have a haze of 30% or less, and, in an embodiment, 2% to 30%. Within this range, the transparent base can be used in the polarizing plate.

In an embodiment, the transparent base may have a thickness of 5 μm to 200 μm, for example, 30 μm to 120 μm. Within this range, the transparent base can be used in the polarizing plate.

In an embodiment, the first protective layer 30 may have a light transmittance of 90% or more, for example, 90% to 100%. Within this range, the first protective layer 30 can transmit incident light therethrough without affecting the incident light. In an embodiment, the first protective layer 30 may have a haze of 30% or less, and, in an embodiment, 1% to 30% or 2% to 20%. Within this range, the transparent base can be used in the polarizing plate and can facilitate improvement in contrast ratio and brightness due to a low level of white turbidity.

The first protective layer 30 may further include a functional coating layer stacked on an upper or lower surface of the transparent base.

The functional coating layer may include at least one selected from among a hard coating layer, a scattering layer, a low reflectivity layer, an ultra-low reflectivity layer, a primer layer, an anti-fingerprint layer, an antireflection layer, and an antiglare layer.

In an embodiment, the first protective layer 30 includes an antireflection layer or a low reflectivity layer as the functional coating layer. Here, a laminate of the first protective layer 30 and the functional coating layer may have a reflectivity of 5% or less, for example, 0.1% to 3%, or 0.2% or less. Within this range, the effects of the present invention can be easily achieved. Here, "reflectivity" may be measured by a typical method known to those skilled in the art. In an embodiment, the functional coating layer may be integrally formed with the first protective layer or may be stacked thereon via an adhesive layer.

In an embodiment, the entirety of the optically functional layer 20 and the first protective layer 30 may have a haze of 30% or less, and, in an embodiment, 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, or 30%, and, in an embodiment, 1% to 30%, or 2% to 20%. Within this range, the optically functional layer 20 and the first protective layer 30 can be used in the polarizing plate and can facilitate improvement in contrast ratio and brightness through reduction in white turbidity.

Referring to FIG. 6, in the polarizing plate, the optically functional layer 20, the first protective layer 30 and a functional coating layer 50 may be sequentially stacked in the stated order on the polarizer 10. Referring to FIG. 7, in the polarizing plate, the first protective layer 30, the optically functional layer 20, and the functional coating layer 50 may be sequentially stacked in the stated order on the polarizer 10. The functional coating layer 50 may include at least one selected from among the hard coating layer, the scattering layer, the low reflectivity layer, the ultra-low reflectivity layer, the primer layer, the anti-fingerprint layer, the antireflection layer, and the antiglare layer, which are mentioned above. In FIG. 7, in an embodiment, the first protective layer 30 may be bonded to the polarizer 10 via an adhesive layer or a bonding layer.

In an embodiment, a laminate of the optically functional layer 20 and the first protective layer 30 may have a haze of 30% or less, and, in an embodiment, 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, or 30%, and, in an embodiment, 1% to 30%, or 2% to 20%. Within this range, the laminate of the optically functional layer 20 and the first protective layer 30 can be used in the polarizing plate and can facilitate improvement in contrast ratio and brightness through reduction in white turbidity.

Polarizer 10

The polarizer 10 serves to polarize incident light from a liquid crystal panel and transmit the polarized light to the optically functional layer 20. The polarizer 10 may be stacked on the light incidence surface of the optically functional layer 20 with reference to internal light of the optical display apparatus.

In an embodiment, the polarizer 10 may include a polyvinyl alcohol-based polarizer prepared by uniaxially stretching a polyvinyl alcohol film.

In an embodiment, the polarizer 10 may have a thickness of about 5 μm to about 40 μm. Within this range, the polarizer 10 can be used in the optical display apparatus.

Second Protective Layer 40

The second protective layer 40 may be stacked on a light incidence surface of the polarizer 10 with reference to internal light of the optical display apparatus.

In an embodiment, the second protective layer 40 may have a light transmittance of 90% or more, for example, 90% to 100%. Within this range, the second protective layer 40 can transmit incident light therethrough without affecting the incident light.

The second protective layer 40 may include a transparent base. The transparent base may include an optically transparent resin film having a light incidence surface and a light exit surface facing the light incidence surface. The transparent base may be composed of a single layer or multiple layers of the optically transparent resin film. The resin may include at least one selected from among a cellulose ester based resin including triacetylcellulose (TAC) and the like, a cyclic polyolefin based resin including an amorphous cyclic olefin polymer (COP) and the like, a polycarbonate based resin, a polyester based resin including polyethylene terephthalate (PET) and the like, a polyether sulfone based resin, a polysulfone based resin, a polyamide based resin, a polyimide based resin, a non-cyclic polyolefin based resin, a polyacrylate based resin including poly(methyl methacrylate) and the like, a polyvinyl alcohol based resin, a polyvinyl chloride based resin, and a polyvinylidene chloride based resin, without being limited thereto. In an embodiment, the transparent base includes a cyclic polyolefin resin, such as an amorphous cyclic olefin polymer (COP) and the like.

Although the transparent base may be a non-stretched film, the present invention is not limited thereto, and the transparent base may be a retardation film or an isotropic optical film which is obtained by stretching the resin by a predetermined method and has a certain range of retardation.

In an embodiment, the transparent base may be an isotropic optical film having an in-plane retardation (Re) of 0 nm to 60 nm, and, in an embodiment, 40 nm to 60 nm. Within this range, the transparent base can provide good image quality through compensation for viewing angle. Here, "isotropic optical film" refers to a film in which nx, ny, and nz (nx and ny being an index of refraction in the slow axis and the fast axis, respectively, and nz being an index of refraction in the thickness direction at a wavelength of 550 nm) have substantially the same value. Here, "substantially the same" includes not only a case in which nx, ny, and nz have exactly the same value, but also a case in which nx, ny, and nz have insignificantly different values.

In another embodiment, the transparent base may be a retardation film having an Re of 60 nm or more. For example, the transparent base may have an Re of 60 nm to 500 nm or an Re of 60 nm to 300 nm. For example, the transparent base may have an Re of 6,000 nm or more or an Re of 8,000 nm or more, and, in an embodiment, 10,000 nm or more, and, in an embodiment, greater than 10,000 nm, and, in an embodiment, 10,100 nm to 30,000 nm, or 10,100 nm to 15,000 nm. Within this range, the transparent base can prevent or substantially prevent appearance of rainbow spots while further enhancing improvement in contrast and visibility by light diffused through the first resin layer.

In an embodiment, the second protective layer 40, specifically the transparent base, may have a thickness of 5 μm to 200 μm, for example 30 μm to 120 μm. Within this range, the second protective layer 40 can be used in the polarizing plate.

In an embodiment, the second protective layer 40 may be bonded to the polarizer 10 via an adhesive layer or a bonding layer.

However, the second protective layer 40 may be omitted from the polarizing plate according to the present invention. Although not shown in FIG. 1, the second protective layer 40 may further include an adhesive layer or a bonding layer stacked on a lower surface thereof such that the polarizing plate can be stacked on an element for optical displays, for example, on an optical display panel therethrough.

An optical display apparatus according to one or more embodiments of the present invention includes the polarizing plate according to an embodiment of the present invention.

In an embodiment, the optical display apparatus may include the polarizing plate according to an embodiment of the present invention as a viewer-side polarizing plate with respect to a liquid crystal panel. Here, the viewer-side polarizing plate refers to a polarizing plate disposed to face a screen with respect to the liquid crystal panel, that is, to face a light source of the optical display apparatus.

In an embodiment, a liquid crystal display may include a light-collecting backlight unit, a light source-side polarizing plate, a liquid crystal panel, and a viewer-side polarizing plate stacked in the stated order, in which the viewer-side polarizing plate includes the polarizing plate according to an embodiment of the present invention. The light source-side polarizing plate refers to a polarizing plate at a light source side. The liquid crystal panel may adopt a vertical alignment (VA) mode, an IPS mode, a patterned vertical alignment (PVA) mode, or a super-patterned vertical alignment (S-PVA) mode, without being limited thereto.

The optical display apparatus may be a foldable or flexible optical display apparatus, or a non-foldable or non-flexible optical display apparatus.

Next, the present invention will be described in further detail with reference to some examples. However, these examples are provided for illustration and are not to be construed in any way as limiting the present invention.

Example 1

(1) As acicular light-diffusing microparticles, a mixture of $CaCO_3$ particles (Whiscal A, length: 10 μm to 30 μm, diameter: 0.5 μm to 2.0 μm, index of refraction: 1.68, Maruo Calcium Co., Ltd.) was prepared and added to a methyl ethyl ketone solution containing KBM503 (3-methacryloxypropyltrimethoxysilane), followed by reaction at room temperature. Next, the resulting product was dried in an oven at 90 °C to remove a solvent, thereby a $CaCO_3$ particle mixture surface modified with 3-methacryloxypropyltrimethoxysilane, was prepared.

A UV curable resin-containing composition (4550P, Shina TNC) was added to the $CaCO_3$ particle mixture, which in turn was stirred using a stirrer for 4 hours, thereby preparing a composition for optically functional layers (content of $CaCO_3$ particle mixture: 10 wt %).

As a first protective layer, a polyethylene terephthalate (PET) film was used. A polyethylene terephthalate (PET) film having a low reflectivity layer formed on an upper surface thereof (DSG-17(Z)PET80, reflectivity: 0.2%, DNP) was prepared. As the first protective layer, the PET film had an in-plane retardation of 8,000 nm at a wavelength of 550 nm and a laminate of the low reflectivity layer and the PET film had an in-plane retardation of 8,000 nm at a wavelength of 550 nm.

An optically functional layer (index of refraction of surface-modified $CaCO_3$ particles: 1.68, index of refraction of resin layer: 1.455, the surface-modified $CaCO_3$ particles being oriented in the resin layer) was formed on a lower surface of the first protective layer by coating the composition for optically functional layers to a thickness of 10 μm on a lower surface of the PET film (including a primer layer) using a coating bar and exposing the composition to light from a BL lamp for 4 seconds (at 80 mJ/cm$^2$), followed by UV curing through irradiation with UV light using a metal halide lamp at 1,000 mJ/cm$^2$.

(2) A polarizer (thickness: 13 μm, light transmittance: 44%) was prepared by stretching a polyvinyl alcohol film to 3 times an initial length thereof at 60 °C, dyeing the stretched film with iodine, and stretching the film to 2.5 times in an aqueous solution of boric acid at 40 °C.

An adhesive layer was formed by depositing a (meth) acrylic adhesive on an upper surface of the polarizer and drying the (meth)acrylic adhesive at 90 °C for 4 minutes, followed by stacking a laminate of the optically functional layer and the first protective layer on an upper surface of the adhesive layer. Next, a cyclic olefin polymer (COP) film (Zeon Co., Ltd.) was bonded to a lower surface of the polarizer, thereby preparing a polarizing plate in which the low reflectivity layer, the first protective layer, the optically functional layer (thickness: 10 μm), the polarizer, and the COP film are sequentially stacked in the stated order. The $CaCO_3$ particles were oriented in the in-plane direction of the optically functional layer wherein the orientation angles had an average of +1.6° and a standard deviation of 7.2°.

Example 2

(1) As acicular light-diffusing microparticles, a mixture of $CaCO_3$ particles (Whiscal A, length: 10 μm to 30 μm, diameter: 0.5 μm to 2.0 μm, index of refraction: 1.68, Maruo Calcium Co., Ltd.) was prepared and added to a methyl ethyl ketone solution containing KBM503 (3-methacryloxypropyltrimethoxysilane), followed by reaction at room temperature. Next, the resulting product was dried in an oven at 90 °C to remove a solvent, thereby a $CaCO_3$ particle mixture surface modified with 3-methacryloxypropyltrimethoxysilane, was prepared.

A UV curable resin-containing composition (4550P, Shina TNC) was added to the $CaCO_3$ particle mixture, which in turn was stirred using a stirrer for 4 hours, thereby preparing a composition for optically functional layers (content of $CaCO_3$ particle mixture: 10 wt %).

(2) A polarizer (thickness: 13 μm, light transmittance: 44%) was prepared by stretching a polyvinyl alcohol film to 3 times an initial length thereof at 60 °C, dyeing the stretched film with iodine, and stretching the film to 2.5 times in an aqueous solution of boric acid at 40 °C.

An adhesive layer was formed by depositing a (meth) acrylic adhesive on an upper surface of the polarizer and drying the (meth)acrylic adhesive at 90 °C for 4 minutes, followed by stacking a polyethylene terephthalate (PET) film (DSG-17(Z)PET80, in-plane retardation at 550 nm: 8,000 nm, DNP) on an upper surface of the adhesive layer. A cyclic olefin polymer (COP) film (Zeon Co., Ltd.) was bonded to a lower surface of the polarizer.

An optically functional layer (index of refraction of surface-modified $CaCO_3$ particles: 1.68, index of refraction of resin layer: 1.455, the surface-modified $CaCO_3$ particles being oriented in the resin layer) was formed on an upper surface of the PET film by coating the composition for optically functional layers to a thickness of 10 μm on the upper surface of the PET film using a coating bar and exposing the composition to light from a BL lamp for 4 seconds (at 80 mJ/cm$^2$), followed by UV curing through irradiation with UV light using a metal halide lamp at 1,000 mJ/cm$^2$.

A low reflectivity layer was formed on an upper surface of the optically functional layer, thereby preparing a polarizing plate in which the low reflectivity layer, the optically functional layer, the first protective layer, the polarizer, and the COP film are sequentially stacked in the stated order. The $CaCO_3$ particles were oriented in the in-plane direction of the optically functional layer wherein the orientation angles had an average of +1.2° and a standard deviation of 5.9°.

Example 3

A polarizing plate was fabricated in the same manner as in Example 1 except that the thickness of the optically functional layer was changed to 15 μm.

Example 4

A polarizing plate was fabricated in the same manner as in Example 2 except that the thickness of the optically functional layer was changed to 15 μm.

Example 5

A polarizing plate was fabricated in the same manner as in Example 1 except that a UV curable resin-containing composition (4530P, Shina TNC) was used instead of the UV curable resin-containing composition (4550P, Shina TNC).

Comparative Example 1

A polarizing plate was fabricated substantially in the same manner as in Example 2 except that a mixture of $CaCO_3$ particles (MX14, Cube type particles, particle diameter: 1.4 μm, Maruo Calcium Co., Ltd.) was used instead of the mixture of $CaCO_3$ particles (Whiscal A, Maruo Calcium Co., Ltd.).

Comparative Example 2

A polarizing plate was fabricated in the same manner as in Example 1 except that a mixture of $CaCO_3$ particles (MX14, Cube type particles, particle diameter: 1.4 μm, Maruo Calcium Co., Ltd.) was used instead of the mixture of $CaCO_3$ particles (Whiscal A, Maruo Calcium Co., Ltd.).

Comparative Example 3

A polarizing plate was fabricated in the same manner as in Example 1 except that the average of the orientation angles and the standard deviation thereof were changed as listed in Table 1.

Comparative Example 4

A polarizing plate was fabricated in the same manner as in Example 2 except that the average of the orientation angles and the standard deviation thereof were changed as listed in Table 1.

Comparative Example 5

A surface-modified $CaCO_3$ particle mixture was prepared in the same manner as in Example 1.

A composition for optically functional layers (content of $CaCO_3$ particle mixture: 10 wt %) was prepared by adding 99.8 parts by weight of a heat curable acrylic adhesive resin (PL8540, heat curable resin, Sadien Co., Ltd.), 0.2 parts by weight of isophorone diisocyanate as a curing agent and methyl ethyl ketone as a solvent to the $CaCO_3$ particle mixture, followed by mixing using a stirrer for 4 hours.

A diffusive adhesive layer was formed by depositing the composition for optically functional layers to a thickness of 10 μm on a lower surface of a PET film (DSG-17(Z)PET80, reflectivity: 0.2%, DNP) having a low reflectivity layer on an upper surface thereof using an applicator, followed by drying the composition in a drying oven at 90 °C for 4 minutes. Thereafter, a polarizing plate in which the low reflectivity layer, the first protective layer, the diffusive adhesive layer (thickness: 10 μm), the polarizer, and the COP film were sequentially stacked in the stated order was fabricated with reference to the method used in Example 1.

Reference Example 1

A polarizing plate was fabricated by sequentially stacking the PET film, the polarizer, and the COP film without the optically functional layer as in the Examples.

A model for measurement of viewing angle was fabricated using each of the polarizing plates fabricated in the Examples and Comparative Examples and was evaluated as to properties shown in Table 1.

After removing a viewer-side polarizing plate from a liquid crystal panel model (55-inch UN55KS8000F, Samsung Electronics Co., Ltd.), each of the polarizing plates fabricated in the Examples and Comparative Examples was attached as the viewer-side polarizing plate to the model to fabricate the model for measurement of viewing angle. In the model for measurement of viewing angle, a light source-side polarizing plate includes a COP film, a polarizer, and a PET film sequentially stacked on a liquid crystal panel in the stated order.

Each of the polarizing plates fabricated in the Examples and Comparative Examples was evaluated as to the following physical properties. Results are shown in Table 1.

(1) Modulus of optically functional layer (unit: MPa): Each of the compositions for optically functional layers prepared in the Examples and Comparative Examples was coated to a thickness of 10 μm to 15 μm on a release film using a coating bar by the same method, followed by exposure to light using a BL lamp at a dose of 80 mJ/$cm^2$ for 4 seconds and UV curing through irradiation with UV light using a metal halide lamp at a dose of 1,000 mJ/$cm^2$, thereby forming an optically functional layer on an upper surface of the PET film. Indentation modulus was measured on a specimen composed of the PET film and the optically functional layer upon pressing one surface of the specimen with a compressive force F of 20 mN/10 sec using a micro-indenter (HM2000Xyp, FISCHER) at 25 °C.

(2) Front brightness and relative brightness (unit: %): An LED light source, a light guide plate, and the model for measurement of viewing angle were assembled into a liquid crystal display including a single edge-type LED light source (the liquid crystal display having the same configuration as a Samsung TV (55 inch UHD TV, Model: UN55KS8000F) except for the configuration of the modules for liquid crystal displays fabricated in the Examples and Comparative Examples). Brightness was measured at the front side (0°, 0°) in the spherical coordinate system using an EZCONTRAST X88RC (EZXL-176R-F422A4, ELDIM S. A.). Relative brightness was calculated according to the formula: {(front brightness of each of the liquid crystal displays of Examples, Comparative Examples, and Reference Example 1)/(front brightness of Reference Example 1)}×100.

(3) Relative contrast at front and lateral side (unit: %): A liquid crystal display was fabricated in the same manner as in (2). Contrast ratios at the front side (0°, 0°) and a lateral side (0°, 60°) were measured in the spherical coordinate system using an EZCONTRAST X88RC (EZXL-176R-F422A4, ELDIM S. A.). The contrast ratio was calculated by a ratio of brightness in white mode to brightness in black mode. In addition, relative contrast ratio was calculated according to the formula: Relative contrast={(contrast ratio of each of the liquid crystal displays of Examples, Comparative Examples, and Reference Example 1)/(contrast ratio of Reference Example 1)}×100.

(4) Pencil hardness: Each of the polarizing plates fabricated in the Examples and Comparative Examples was attached to a glass plate, followed by measurement of pencil hardness on a surface of the antireflection layer under a load of 200 g using a pencil hardness tester (CT-PC2, Core Technology Co., Ltd.) in accordance with ASTM D3502. A polarizing plate having a pencil hardness of 2H or more can be used at the outermost side in an optical display apparatus.

(5) Mandrel Evaluation: Each of the polarizing plates fabricated in the Examples and Comparative Examples was cut into a rectangular specimen such that the polarizer had a size of 150 mm×25 mm (MD×TD). The specimen was wound on a mandrel rod such that COP film of the polarizing plate contacted the mandrel rod (having a circular cross-section), and was left at room temperature for 5 seconds to evaluate generation of cracks over the entirety of the polarizing plate. An initial diameter of the mandrel rod allowing generation of cracks was evaluated by changing the diameter of the mandrel rod (unit: mm). An initial diameter of 9 mm or less indicates a polarizing plate that can be used in a foldable display due to good flexibility.

(6) Average and standard deviation of orientation angles: A surface image of each of the optically functional layers formed in the Examples and Comparative Examples was captured using an optical microscope (Olympus MX61L, magnification: 500× (10×50)) adjusted in height to be focused on the surface of the optically functional layer, followed by executing the FIJI program (Method: Fourier Components, N bis: 90°, histogram start: 0°, histogram end: 180°), thereby obtaining an average and a standard deviation of orientation angles of the microparticles in the optically functional layer.

TABLE 1

| | | Example | | | | | Comparative Example | | | | | Reference Example |
|---|---|---|---|---|---|---|---|---|---|---|---|---|
| | | 1 | 2 | 3 | 4 | 5 | 1 | 2 | 3 | 4 | 5 | 1 |
| Particle | Shape | A | A | A | A | A | C | C | A | A | A | |
| Optically functional layer | Thickness (μm) | 10 | 10 | 15 | 15 | 10 | 10 | 10 | 10 | 10 | 10 | — |
| | Particle content (wt %) | 10 | 10 | 10 | 10 | 10 | 10 | 10 | 10 | 10 | 10 | — |
| | Average of orientation angles | +1.6 | +1.2 | −1.1 | +1.2 | +2.3 | — | — | +90 | +90 | +1.2 | — |
| | Standard deviation of orientation angles | 7.2 | 5.9 | 5.7 | 6.9 | 6.6 | — | — | 6.5 | 5.8 | 7.2 | — |
| | Resin | UV | UV | UV | UV | UV | UV | UV | UV | UV | Heat | — |
| First protective layer | Re | 8000 | 8000 | 8000 | 8000 | 8000 | 8000 | 8000 | 8000 | 8000 | 8000 | 8000 |
| Optically functional layer | Modulus | $2.4 \times 10^3$ | $2.5 \times 10^3$ | $3.1 \times 10^3$ | $3 \times 10^3$ | $2.1 \times 10^3$ | $2.4 \times 10^3$ | $2.4 \times 10^3$ | $2.4 \times 10^3$ | $2.4 \times 10^3$ | $7 \times 10^{-2}$ | — |
| Relative brightness | Front | 97 | 96 | 93 | 96 | 96 | 94 | 96 | 91 | 90 | 100 | 100 |
| Contrast ratio (%) | Front | 63 | 65 | 50 | 53 | 61 | 58 | 66 | 49 | 47 | 63 | 100 |
| | Lateral | 108 | 107 | 106 | 108 | 115 | 98 | 88 | 63 | 60 | 103 | 100 |
| Pencil hardness | | 2H | 2H | 2H | 2H | 2H | 2H | 2H | 2H | 2H | 1H | — |
| Mandrel | | 8 | 9 | 9 | 9 | 8 | 9 | 8 | 8 | 9 | 11 | — |

A: Acicular, C: Cube

As shown in Table 1, the polarizing plates according to the present invention could improve contrast ratio and/or brightness while securing good hardness and flexibility, even without formation of an optical pattern or a pattern layer including the optical pattern.

By contrast, the polarizing plates of the Comparative Examples not satisfying the features of the present invention could not provide all of the advantageous effects of the present invention, as shown in Table 1.

While some embodiments of the present invention have been described herein, it is to be understood that various modifications, changes, alterations, and equivalent embodiments may be made by those skilled in the art without departing from the spirit and scope of the present invention.

What is claimed is:

1. A polarizing plate comprising:

a polarizer; and an optically functional layer and a first protective layer stacked on a light exit surface of the polarizer, wherein the optically functional layer comprises: a resin layer; and acicular microparticles which are uniformly oriented and dispersed in the resin layer, the resin layer being formed from a composition including an active energy ray curable resin, the acicular microparticles having a length of 10 μm to 30 μm, and an average of an aspect ratio of 5 to 60, being oriented in an in-plane direction of the optically functional layer, and orientation angles between longitudinal directions of the acicular microparticles and a light absorption axis of the polarizer have an average that is within 10° with a standard deviation of 7.5° or less; and wherein the optically functional layer has an indentation modulus of $2.0\times10^3$ MPa to $3.5\times10^3$ MPa, as measured on the optically functional layer upon pressing a surface of the optically functional layer with a force F=20 mN/10 sec using a micro-indenter at 25 °C.

2. The polarizing plate according to claim 1, wherein the optically functional layer and the first protective layer are sequentially stacked on the polarizer in the stated order, or the first protective layer and the optically functional layer are sequentially stacked on the polarizer in the stated order.

3. The polarizing plate according to claim 1, wherein the optically functional layer comprises a contrast ratio-enhancing layer.

4. The polarizing plate according to claim 1, wherein the optically functional layer is flat on overall upper and lower surfaces thereof.

5. The polarizing plate according to claim 1, wherein the acicular microparticles are impregnated into the resin layer.

6. The polarizing plate according to claim 1, wherein the acicular microparticles have a higher index of refraction than the resin layer.

7. The polarizing plate according to claim 6, wherein a difference in index of refraction between the acicular microparticles and the resin layer is 0.8 or less.

8. The polarizing plate according to claim 1, wherein the composition is an active energy ray curable composition.

9. The polarizing plate according to claim 8, wherein the composition comprises at least one selected from among a photoinitiator and a polyfunctional monomer.

10. The polarizing plate according to claim 1, wherein the acicular microparticles are present in an amount of 1 wt % to 30 wt % in the optically functional layer.

11. The polarizing plate according to claim 10, wherein the acicular microparticles have a higher index of refraction than the resin layer.

12. The polarizing plate according to claim 1, wherein the acicular microparticles are formed of at least one selected from among titanium oxide, zirconium oxide, zinc oxide, calcium carbonate, boehmite, aluminum borate, calcium silicate, magnesium sulfate, magnesium sulfate hydrate, potassium titanate, glass, and a synthetic resin.

13. The polarizing plate according to claim 1, wherein a surface of the acicular microparticles is modified.

14. The polarizing plate according to claim 1, wherein the acicular microparticles have a diameter of 0.5 μm to 2 μm.

15. The polarizing plate according to claim 1, wherein the first protective layer has an in-plane retardation of 4,000 nm or more at a wavelength of 550 nm.

16. The polarizing plate according to claim 1, wherein the first protective layer further comprises a functional coating layer on an upper surface thereof or on a lower surface thereof.

17. The polarizing plate according to claim 16, wherein the functional coating layer comprises at least one selected from among a hard coating layer, a scattering layer, a low reflectivity layer, an ultra-low reflectivity layer, a primer layer, an anti-fingerprint layer, an antireflection layer, and an antiglare layer.

18. An optical display apparatus comprising the polarizing plate according to claim 1.

* * * * *